United States Patent [19]

Chamran et al.

[11] 4,318,616
[45] Mar. 9, 1982

[54] MANUAL WAVELENGTH ADJUSTMENT FOR A MICROPROCESSOR BASED SPECTROPHOTOMETER

[75] Inventors: Morteza M. Chamran, Elmhurst, Ill.; Larkin B. Scott, Fort Worth, Tex.; Paul B. Williams, Lombard, Ill.

[73] Assignee: The Perkin-Elmer Corporation, Norwalk, Conn.

[21] Appl. No.: 128,029

[22] Filed: Mar. 7, 1980

[51] Int. Cl.³ .............................................. G01J 3/18
[52] U.S. Cl. .................................... 356/332; 356/334; 364/498
[58] Field of Search ............................... 356/319–325, 356/312, 315, 332–334, 328; 364/498

[56] References Cited

PUBLICATIONS

Morgenthaler et al., *American Laboratory*, vol. 8, No. 8, Aug. 1976, pp. 37–45.
*Byte*, vol. 4, No. 10, Oct. 1979, pp. 33–40.
Cordos et al., *Analytical Chemistry*, vol. 45, No. 2, Feb. 1973, pp. 425–433.
Aaronson et al., *American Laboratory*, vol. 7, No. 9, Sep. 1975, pp. 57–63.

*Primary Examiner*—F. L. Evans
*Attorney, Agent, or Firm*—F. L. Masselle; E. T. Grimes; R. A. Hays

[57] ABSTRACT

A microprocessor based spectrophotometer including manual keyboard command for sequencing a monochromatic energy beam through a spectral range of wave-lengths to a keyboard selected wavelength. A manual adjustment knob is thereafter rotatable for generating a 4-bit gray code signal which successively changes as the adjustment knob is rotated. The microcomputer senses a change in the gray code signal and indexes (steps) the wavelength of the monochromatic beam in proportion to the positional change of the adjustment knob as indicated by the changing gray code. A visual display indicating wavelength setting and spectral response, is updated conjointly with manual wavelength adjustment.

8 Claims, 2 Drawing Figures

MANUAL WAVELENGTH ADJUSTMENT FOR A MICROPROCESSOR BASED SPECTROPHOTOMETER

RELATED PATENT APPLICATION

This application is related to the following four U.S. patent applications filed on even date herewith: (1) Ser. No. 128,027, entitled SPECTROPHOTOMETER IMPROVEMENT OF IMPROVED AUTOMATIC WAVELENGTH INDEXING INITIALIZATION APPARATUS, by M. Chamran et al; (2) Ser. No. 128,030, entitled FILTER INDEXING FOR SPECTROPHOTOMETER SYSTEM, by M. Chamran; (3) Ser. No. 128,028, entitled SAFE MEMORY SYSTEM FOR SPECTROPHOTOMETER by P. Williams; and (4) Ser. No. 128,289, entitled A SPECTROPHOTOMETER SYSTEM HAVING POWER LINE SYNCHRONIZATION, by M. Chamran et al.

BACKGROUND OF THE INVENTION

The invention relates to apparatus for permitting an operator to manually adjust the wavelength of a monochromatic beam of a spectrophotometer system, and more particularly, to a manual wavelength adjustment for a microprocessor based spectrophotometer.

In a spectrophotometer system, a microcomputer may accurately control the optical system for continually changing the wavelength of the monochromatic beam and for directing the beam through a sample cell. In such a system, the microcomputer steps through a plurality of discrete wavelengths in a predetermined sequence and samples the output response of the beam passing through the cell in order to produce a recorded output of the spectral response of the substance contained in the sample cell.

However, there are times in which the operator wishes to study the position (response) of absorption peaks or emission lines of the analysis. Also, the operator may wish to study a particular wavelength response during system calibration.

Therefore, it would be highly desirable if the operator had the capability of stopping the spectrophotometer analysis at a particular wavelength and thereafter be able to vary the wavelength of radiant energy passing through the sample cell, at a rate controlled by the operator.

It is, therefore, an object of the present invention to provide a manual control in a microprocessor based spectrophotometer for permitting manual varying of the wavelength of radiant energy passing through the sample cell.

SUMMARY OF THE INVENTION

This and other objects of the invention are achieved by a control manually actuable by the operator for generating a control signal bearing information related to the extent of actuation of the manual control. A microprocessor responds to the control signal for generating an indexing signal to an indexable diffraction system for changing the wavelength of the monochromatic beam in accordance with the control signal. The microprocessor conjointly controls a display device for visually displaying to the operator the wavelength value of the monochromatic beam of the system and the spectral response of the sample through which the beam is directed.

DESCRIPTION OF THE PREFERRED EMBODIMENT

Figure 1:
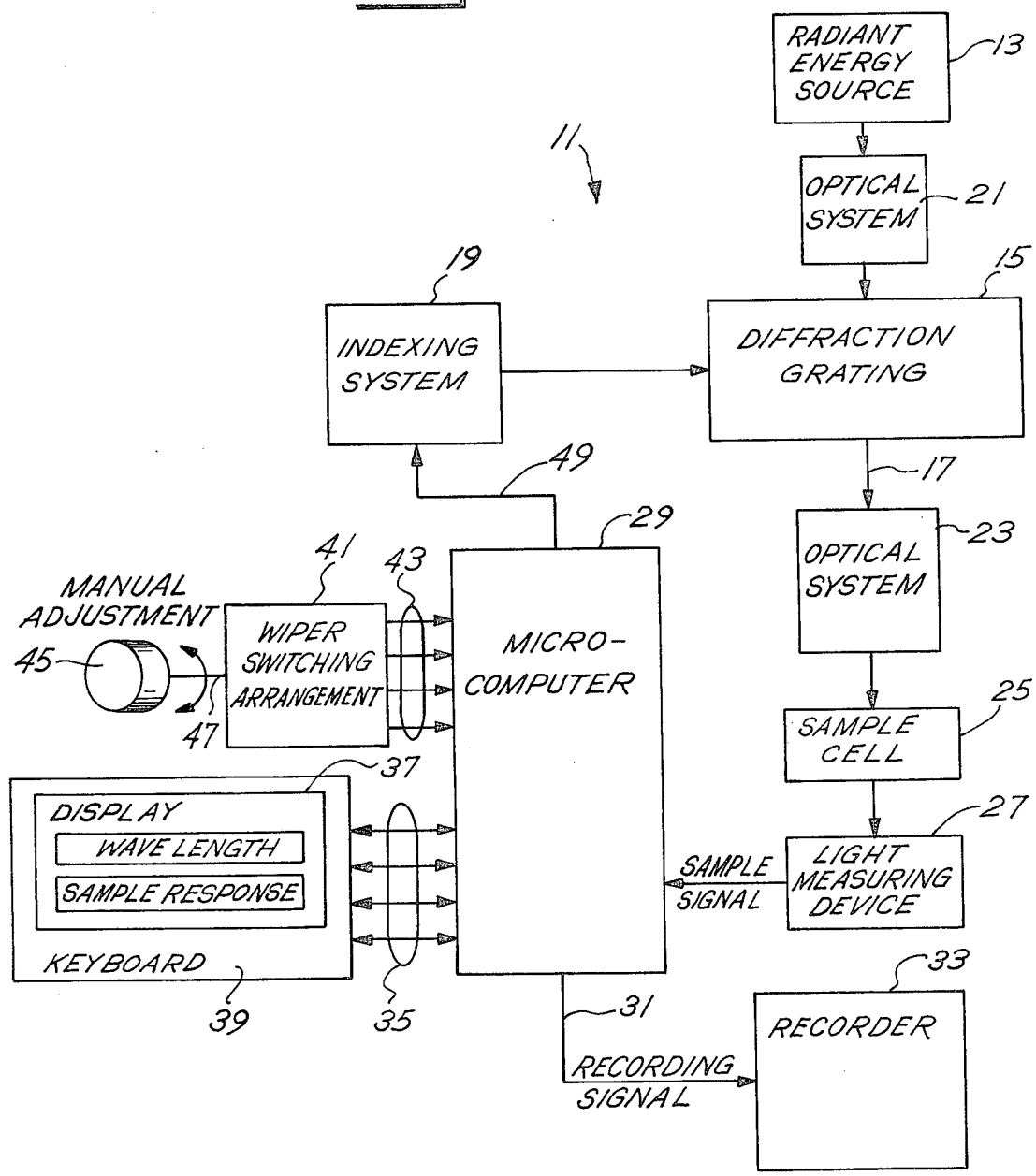
FIG. 1 is a block diagram of a preferred embodiment of the spectrophotometer of the present invention

The related applications referred to above disclose specific apparatus of features broadly described herein; such applications are incorporated herein by reference. Specific apparatus necessary for understanding the preferred embodiment of the present invention are described as follows:

With reference to FIG. 1, a spectrophotometer system 11 includes a radiant energy source 13 which provides a beam of radiation to a diffraction grating 15 for generating a beam 17 of monochromatic radiant energy (hereinafter monochromatic light). An indexing system 19 controls diffraction grating 15 for changing the wavelength of the monochromatic light in sequence over a predetermined spectral range.

A first optical system 21 is disposed between source 13 and grating 15, and a second optical system 23 is disposed between grating 15 and a sample cell 25. The optical systems 21, 23 insure proper generation of the monochromatic light and serve to direct the monochromatic light through sample cell 25 and onto a light measuring device 27. Measuring device 27 generates a SAMPLE signal as the measure of radiant energy passing through the substance in sample cell 25, hereinafter referred to as the spectral response of light measuring device 27.

A conventional microcomputer 29 controls the overall system processing and management of the spectrophotometer system 11. The microcomputer performs a number of tasks which may be summarized as follows:

(1) data is retrieved from light measuring device 27 in the form of an analog signal which is converted to a digital signal for processing; the processed digital signal is converted to an analog recording signal for output along a bus 31 to a recorder 33; the processed digital signal also is converted to display data for output along a bus 35 to a display 37 and keyboard 39;

(2) scanning information is received from keyboard 39 and is manipulated to provide output commands to indexing system 19 for sequencing diffraction grating 15 through a spectral range or sending diffraction grating 15 to a selected wavelength;

(3) coded information is received from a wiper-switching arrangement 41 along a bus 43 and is manipulated to provide output commands to indexing system 19; and (4) other displays data is generated and transmitted to display device 37 for visually displaying an indication of the particular wavelength of the monochromatic beam passing through sample cell 25.

Microcomputer 29 is a conventional 8-bit, parallel bus microprocessor having an accumulator, a plurality of registers, and a CPU control for interpretation and execution of micro-level assembly language instructions; a memory system including random access memory and read-only memory is also included in microcomputer 29, as will be understood. The microcomputer treats recorder 33, keyboard 39, display device 37 and wiper switching arrangement 41 as peripheral devices which are interconnected by means of bus cables.

One suitable microprocessor for use in microcomputer 29 is a Motorola MC6802. Reference is made to Motorola manual ADI-436 which describes the MC6802, and reference is made to "Introduction to Microprocessors", by Herve Tireford of Motorola Semiconductor Products, Inc., 1975.

The system is managed under the control of keyboard 39 permitting the operator to select the spectral range over which the monochromatic beam is to be sequenced. The keyboard may also be used to select a particular wavelength to be generated by diffraction grating 15. Other keyboard control features may also be provided.

Spectrophotometer system 11 includes a manual adjustment knob 45 connected to wiper-switching arrangement 41 via a drive rod 47. Arrangement 41 generates a four bit digital signal along bus 43 to microcomputer 29. The digital signal is sequenced through a gray code as knob 45 is rotated.

Microcomputer 29 monitors the value of the signal appearing along bus 43 for determining whether the signal is changing in time. Once microcomputer 29 monitors a change in signal appearing on bus 43, the microcomputer begins producing a pulse output along bus 49 to indexing system 19. The pulse output along bus 49 is generated at a frequency proportional to the rate of change of the gray code on bus 43. The rate of change of the gray code on bus 43 will be proportional to the rate of rotation of knob 45.

When the operator is utilizing the system, he may instruct microcomputer 29 via keyboard 39 to sequence diffraction grating 15 to a select wavelength which will be maintained at the selected value until the microcomputer is instructed to change wavelength. The operator views display 37 as the display sequences through wavelengths until the selected wavelength is reached.

When the selected wavelength is reached, as indicated by display device 37, the operator may rotate knob 45 while viewing display device 37. Knob 45 may be adjusted slowly to surrounding wavelengths so that the operator may view the spectral response indicated on display 37.

As the gray code on bus 43 successively changes and pulses are responsively generated along bus 49, microcomputer 29 also generates display signals to display 37 for adjusting the visual indication on the display conjointly with the pulsing along bus 49.

Figure 2:
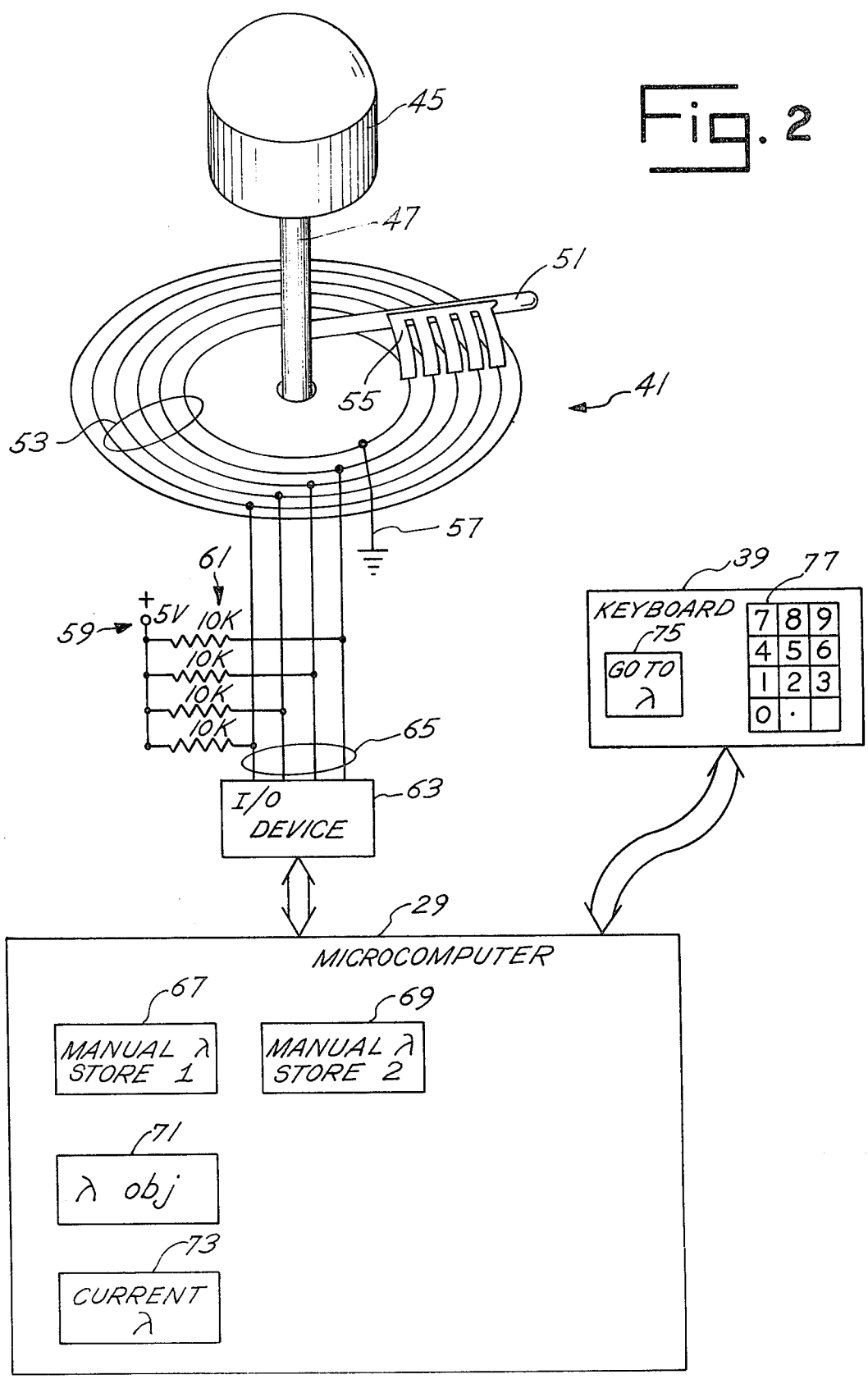
FIG. 2 is a partial schematic and partial block diagram of the manual adjustment system of the spectrophotometer of FIG. 1.

Referring to FIG. 2, a wiper-switching arrangement 41 is illustrated in greater detail as including a wiper member 51 and five (5) concentric, electrically coded, wiper tracks 53. Wiper member 51 is secured to shaft 47 and rotates according to manipulation of knob 45. The wiper member 51 carries five (5) wiper arms, indicated by reference numeral 55, which depend from member 51, each separately tracking an individual track 53, as shown. The innermost track is grounded via line 57 for providing a circuit path from a 5-volt source 59 through each of resistors 61, and through each of the tracks 53 and through each of the wiper arms 55, each of which are electrically connected. The tracks 53 are coded in sixteen (16) consecutive 4-bit gray codes around the tracks 53, so that an input/output device 63 successively sees the sixteen codes as knob 45 makes a single revolution. As will suggest itself, other means of generating a gray code which change in accordance with movement of knob 45 may be utilized.

Microcomputer 29 addresses input/output (I/O) device 63 at selected times for reading the gray code appearing along line 65. Microcomputer 29 converts the read gray code to a binary number and stores the same in either of memory locations 67 or 69 depending upon which of the locations was utilized previously for storing the last gray code. The binary numbers appearing in location 67, 69 (representing the present gray code number and the previous gray code number) are subtracted and the difference is added to a WAVELENGTH OBJECTIVE memory location 71. Where knob 45 has not been rotated since I/O device was previously read, the differences in binary numbers stored in locations 67, 69 will be zero, and thus the value in wavelength objective location 71 will remain the same.

The current wavelength being generated by the diffraction grating 15 is represented by a binary number which is stored in CURRENT WAVELENGTH memory location 73. The CURRENT WAVELENGTH memory location is updated in accordance with the indexing of diffraction grating 15. Microcomputer 29 compares the values stored in WAVELENGTH OBJECTIVE location 71 and CURRENT WAVELENGTH location 73 for determining whether diffraction grating 15 should be indexed via indexing system 19.

When microcomputer 29 determines that the wavelength should be changed in view of the values stored in locations 71, 73, microcomputer 29 determines the direction the wavelength should be moved and then begins stepping a stepping motor of indexing system 19 and incrementing the value stored in CURRENT WAVELENGTH location 73. The stepping is discontinued when the value stored in CURRENT WAVELENGTH location 73 equals the value stored in WAVELENGTH OBJECTIVE location 71.

In order to step the motor of indexing system 19, microcomputer 29 provides a 4-bit data word to a motor driver output port (not shown) for stepping the motor in a conventional fashion. The 4-bit data word may be formed from the four least significant bits of the number stored in CURRENT WAVELENGTH location 73, as the location 73 is incremented.

Keyboard 39 includes a GO TO wavelength key 75. A numeric keypad 77 is also included in keyboard 39 for use in association with GO TO key 75 in order to send the spectrophotometer to a particular wavelength. The selected wavelength is keyed on pad 77 and the GO TO key 75 is actuated for providing an instruction to microcomputer 29.

Microcomputer 29 responds to the GO TO instruction by loading in WAVELENGTH OBJECTIVE location 71 the appropriate binary number representative of the wavelength selected by keypad 77. The microcomputer will then step indexing system 19 until the value of CURRENT WAVELENGTH location 73 is equal to the value of WAVELENGTH OBJECTIVE location 71.

During a sequential scan through a plurality of wavelengths, the microcomputer will not respond to an adjustment made by control knob 45 until after diffraction grating 15 has stopped its sequencing. As will suggest itself, the speed with which CURRENT WAVELENGTH location 73 is incremented and then compared to WAVELENGTH OBJECTIVE location 71, can be controlled by conventional software delay.

During operation of the main program of microcomputer 29, the microcomputer will generate a visual display on display device 37 of the particular wavelength passing through sample cell 25. Microcomputer 29 utilizes the value stored in CURRENT WAVELENGTH memory location 73 for generating a wavelength display representative of the value stored in location 73. Conventional multiplexing of four (4) separate 7-segmented lighting devices may be utilized to generate the visual display from display device 37, as will suggest itself.

It should be understood, of course, that the foregoing disclosure relates to a preferred embodiment of the invention and that other modifications or alterations may be made therein without departing from the spirit or scope of the invention as set forth in the appended claims.

What is claimed is:

1. A spectrophotometer comprising:
   monochromator means for providing monochromatic light at a sequence of wavelengths over a predetermined spectral range, said monochromator means being responsive to an indexing signal for successively changing in steps the wavelength of said monochromatic light in said sequence;
   a sample cell;
   a light measuring device;
   means for directing said monochromatic light through said sample cell and onto said light measuring device;
   control means manually actuable for generating a control signal, said control signal carrying information as to the extent of operator actuation;
   microcomputer means responsive to said control signal for generating said indexing signal in accordance with said information, said indexing signal generated for changing the wavelength in a number of said steps proportional to said extent of operator actuation of said control means.

2. A spectrophotometer according to claim 1 wherein said control means includes means for generating a digital signal changing in time at a frequency related to the extent of operator actuation.

3. A spectrophotometer according to claim 2, wherein said digital signal is changing in gray code.

4. A spectrophotometer according to claim 2 wherein said conrol means includes a knob control manually actuable for producing mechanical motion for defining the extent of operator actuation of said control means.

5. A spectrophotometer according to claim 1 and further including:
   keyboard means manually actuable for generating a command signal for selecting a particular wavelength value of the monochromatic light passing through said sample cell; and
   wherein said microcomputer means is connected to said keyboard means, said microcomputer means being responsive to said command signal for indexing said monochromator means to said particular wavelength.

6. A spectrophotometer according to claim 5 wherein said microcomputer is nonresponsive to said control signal during indexing of said monochromator means to said particular wavelength after said keyboard means generates a command signal.

7. A spectrophotometer according to claim 1 and further including display means for visually indicating the wavelength of the monochromatic light passing through said sample cell; and wherein said microcomputer means generates display signals for changing the wavelength visually indicated on said display means in conjunction with manual actuation of said control means.

8. A spectrophotometer according to claim 7 wherein said display means includes a display location for visually indicating the spectral response of the substance in said sample cell, said spectral response occurring at the wavelength of light visually indicated by said display means.

* * * * *